United States Patent
Zhang et al.

(10) Patent No.: US 7,574,726 B2
(45) Date of Patent: Aug. 11, 2009

(54) RESOURCE ALLOCATION IN MULTI-STREAM IP NETWORK FOR OPTIMIZED QUALITY OF SERVICE

(75) Inventors: Qian Zhang, Kowloon (HK); Ya-Qin Zhang, West Windsor, NJ (US); Wenwu Zhu, Basking Ridge, NJ (US)

(73) Assignee: Microsoft Corporation, Redmond, WA (US)

( * ) Notice: Subject to any disclaimer, the term of this patent is extended or adjusted under 35 U.S.C. 154(b) by 581 days.

(21) Appl. No.: 11/277,260

(22) Filed: Mar. 23, 2006

(65) Prior Publication Data

US 2006/0156200 A1  Jul. 13, 2006

Related U.S. Application Data

(63) Continuation of application No. 09/865,941, filed on May 25, 2001, now Pat. No. 7,260,826.

(60) Provisional application No. 60/208,659, filed on May 31, 2000.

(51) Int. Cl.
  *H04L 12/00* (2006.01)
  *H04N 7/12* (2006.01)
  *H04J 1/16* (2006.01)
  *G08C 15/00* (2006.01)
  *H04N 7/173* (2006.01)

(52) U.S. Cl. ............. 725/95; 725/94; 370/252; 370/519; 375/240.22; 375/240.29

(58) Field of Classification Search ........... 370/249, 370/252, 519; 375/240.22, 240.23, 240.29, 375/240.03; 714/746–748; 725/94, 95, 126
See application file for complete search history.

(56) References Cited

U.S. PATENT DOCUMENTS

| | | | | |
|---|---|---|---|---|
| 3,979,719 | A | * | 9/1976 | Tooley et al. ............... 714/748 |
| 5,754,754 | A | * | 5/1998 | Dudley et al. ................ 714/18 |
| 5,781,532 | A | * | 7/1998 | Watt ........................... 370/236 |
| 5,802,106 | A | * | 9/1998 | Packer ....................... 375/225 |
| 5,969,764 | A | | 10/1999 | Sun et al. |
| 6,014,694 | A | * | 1/2000 | Aharoni et al. ............. 709/219 |
| 6,289,482 | B1 | * | 9/2001 | Joshi et al. ................. 714/748 |
| 6,351,491 | B1 | | 2/2002 | Lee et al. |
| 6,650,705 | B1 | * | 11/2003 | Vetro et al. ............ 375/240.08 |
| 6,687,294 | B2 | | 2/2004 | Yan et al. |
| 6,697,382 | B1 | * | 2/2004 | Eatherton ................... 370/503 |

(Continued)

OTHER PUBLICATIONS

Eckert, et al., "Bit-rate Allocation in Multi-Object Video Coding"; UPM Proposal, Jul. 1998, pp. 1-20.

(Continued)

*Primary Examiner*—Christopher Kelley
*Assistant Examiner*—Reuben M Brown
(74) *Attorney, Agent, or Firm*—Lee & Hayes, PLLC

(57) ABSTRACT

A resource allocation of multiple compressed AV streams delivered over the Internet is disclosed that achieves end-to-end optimal quality through a multimedia streaming TCP-friendly transport (MSTFP) protocol that adaptively estimates the network bandwidth while smoothing the sending rate. Resources allocated dynamically according to a media encoding distortion and network degradation algorithm. A scheme is also disclosed for dynamically estimating the available network bandwidth for streaming of objects, such as MPEG4 multiple video objects, in conjunction with the MSTFP protocol. The scheme can account for packet-loss rates to minimize end-to-end distortion for media delivery.

7 Claims, 7 Drawing Sheets

U.S. PATENT DOCUMENTS 6,771,595 B1 * 8/2004 Gilbert et al. .............. 370/229
2001/0043618 A1 * 11/2001 Chien et al. ................ 370/498

OTHER PUBLICATIONS

Padhye, et al., "Modeling TCP Throughput: A Simple Model and its Empirical Validation", SIGCOMM '98, pp. 303-314.

Veracheure, et al., "MPEG-2 Video Services over Packet Networks: Joint Effect on Encoding Rate and Data Loss on User-Oriented QoS", NOSSDAV 98, Jul. 1998, pp. 257-264.

* cited by examiner

1: receive state

0: loss state

RESOURCE ALLOCATION IN MULTI-STREAM IP NETWORK FOR OPTIMIZED QUALITY OF SERVICE

CROSS-REFERENCE TO RELATED APPLICATIONS

This U.S. Non-Provisional patent application is a continuation application of U.S. Ser. No. 09/865,941, now U.S. Pat. No. 7,260,826, filed 25 May 2001, which claims the benefit of priority to U.S. Provisional Patent Application No. 60/208,659, filed on 31 May 2000, which is hereby incorporated by reference in its entirety.

TECHNICAL FIELD

The present invention relates to systems and methods for streaming media (e.g., video and audio) over a network, such as the Internet.

BACKGROUND OF THE INVENTION

With the success of the Internet and growing network resources, audio and video streaming is of enormous interest among Internet multimedia applications. Recently, tools such as RealPlay™ software and Microsoft NetShow® software have been developed to stream media content over a network. There remain, however, challenges to the streaming of media over the IP-based Internet due to issues such as the lack of a quality of service (QoS) guarantee, bandwidth variations, packet-losses, delays varying from time to time, and unknown network characteristics.

Since the Internet is a shared environment and does not micro-manage utilization of its resources, end systems are expected to be cooperative by reacting to congestion properly and promptly. As a result, overall utilization of the network remains high while each flow obtains a fair share of resources. Unfortunately, many of the current commercial streaming applications do not behave in a network-friendly fashion.

The available bandwidth in the Internet fluctuates frequently in nature. Most conventional streaming applications are unable to perform quality adaptation as available bandwidth changes, especially quality adaptation among multiple streams. Thus, these conventional streaming applications do not make effective use of the bandwidth.

To date several schemes have been developed for QoS management such as resource reservation, priority mechanism, and application level control. Prior art QoS management schemes and other background information, referred to elsewhere in the document, are presented in the following publications, each of which is incorporated herein by reference in entirety:

1. R. Braden, L. Zhang, S. Berson et al, "Resource ReSerVation Protocol (RSVP)—Version 1 Functional Specification", *RFC* 2205, September 1997 ("hereinafter, "Braden et al.");
2. R. Rejaie, M. Handley, and D. Estrin, "Quality adaptation for congestion controlled video playback over the Internet", *Proceedings of SIGCOM* 99 ("hereinafter, "Rejaie et al. [*SIGCOM*]");
3. R. Rejaie, M. Handley, and D. Estrin, "An end-to-end rate-based congestion control mechanism for realtime streams in the Internet", *Proceedings of INFOCOMM* 99, 1999 ("hereinafter, "Rejaie et al. [*INFOCOMM*]");
4. T. Chiang and Y. Q. Zhang, "A new rate control scheme using quadratic rate-distortion modeling", *IEEE Trans. Circuits Syst. Video Technol.*, February 1997 ("hereinafter, "Chiang et al.");
5. D. Sisalem and H. Schulztinne, "The loss-delay based adjusted algorithm: A TCP-friendly adaptation scheme", *Proceedings of NOSSDAV*'98, 1998 ("hereinafter, "Sisalem et al.");
6. J. Padhye, V. Firoiu, D. Towsley and J. Kurose, "Modeling TCP throughput: A simple model and its empirical validation", *Proceedings of SIGCOM*'98, 1998 ("hereinafter, "Padhye et al.");
7. O. Verseheure, P. Frossard and M. Hamdi, "MPEG-2 video services over packet networks: joint effect of encoding rate and data loss on user-oriented QoS", *Proceedings of NOSSDAV* 98, 1998 ("hereinafter, "Verscheure et al.");
8. A. Vetro, H. F. Sun and Y. Wang. "MPEG-4 rate control for multiple video objects". *IEEE Trans. Circuits Syst. Video Technol.*, February 1999 ("hereinafter, "Vetro et al."); and
9. M. Eckert and J. I. Ronda. "Bit-rate allocation in multi-object video coding". ISO/IEC JTC1/SC29/WG11 MPEG98/m3757, Dublin, Ireland ("hereinafter, "Eckert et al.").

Among the foregoing QoS management schemes, resource reservation for supporting a certain QoS level, which was proposed by Braden et al., is the most straightforward approach. However since it is difficult to know the characteristics of a stream in advance, one may tend to over-allocate resources in order to guarantee the requested QoS level, leading to network under-utilization. Besides that, the most challenging issue for the resource reservation mechanism is that it is both difficult and complex to implement and to deploy.

In priority mechanisms, different data packets or streams are labeled with different priorities and thereby treated differently at the network routers. While this approach is simple, the exact mechanism for setting the priority levels, the router mechanism for controlling these levels, and the actual gain are unclear.

In application level control scheme, the QoS is controlled by adapting the sender transmission rate as was taught by Rejaie et al. [*SIGCOM*] and Chiang et al. Most of the control algorithms, however, randomly distribute resources among multiple streams without a global coordination mechanism. In order to employ a global coordination scheme, traffic control is usually adopted. There are several TCP-friendly rate adjustment protocols that have been reported recently. It has been proposed that transport protocols, including those taught by Rejaie et al. [*INFOCOMM*] and Sisalem et al. who teach transport protocols where the throughput of a long-lived-TCP connect is calculated based on the TCP characterization. However, Padhye et al. demonstrated that the above approaches to calculating the throughput are not accurate in cases where the packet-loss rate is higher than five percent (5%). Since this approach does not account for retransmission timeouts, it usually overestimates the throughput of a connection as the packet-loss rate increases.

Other challenges to streaming video include network bandwidth adaptation, media adaptation, and error resilience. Network bandwidth adaptation deals with dynamic network bandwidth estimation, while media adaptation controls the media bit rate according to the network conditions. Error resilience refers to the ability to track, localize and recover transmission errors.

Without bandwidth adaptation, video transmission tends to compete unfairly with other TCP traffic, causing network congestion and resulting in a lower transmission rate for other TCP traffic. In addition, congestion collapse occurs when the aggregate bandwidth of the media traffic exceeds the network capacity. In order to dynamically adjust the transmission rate while co-existing with other TCP-based applications, several congestion control protocols have been proposed to adapt the sending rate in such a way that congested bandwidth is shared "fairly" with TCP applications. The majority of these protocols are based on TCP characterizations. Specifically, in the absence of retransmission time-outs, the steady state throughput of a long-lived TCP connect is given by:

$$Throughput = \frac{C}{R * \sqrt{p}}, \qquad (1)$$

where C is a constant that is usually set to either 1.22 or 1.31, depending on whether the receiver uses delayed acknowledgments, R is the round trip time experienced by the connection, and p is the expected number of window reduction events per packet sent. Since Equation (1) does not account for retransmission timeouts, it usually overestimates the connection throughput as packet-loss rate increases. It is has been reported that Equation (1) is not accurate for packet-loss rates higher than 5%.

MPEG-4 is an object-based coding standard in which a visual scene typically has several video objects (VOs), each characterized by its shape, motion, and texture. The VOs are coded into separate bit streams that can be individually accessed and manipulated. The composition information is sent in a separate stream. To date several prior art rate control algorithms have been proposed. One such rate control algorithm was proposed by Chiang et al. for a single VO using a quadratic rate-quantizer model as the baseline rate control scheme used in the MPEG4 standard. This rate control scheme was extended by Vetro et al. to multiple video objects (MVOs). As taught by both Chiang et al. and Vetro et al., the total target bit rate for all objects is controlled by a "joint-buffer" and allocated proportionally to the motion; size, and square of MAD (mean absolute distortion). For MVOs, Eckert et al. taught several straightforward approaches based upon the video object importance level. Although these approaches allow different objects to be encoded at different frame rates, when put in one scene, these objects with different frame rates may cause a break in the composition information and can result in unacceptable video reconstruction.

When MPEG-4 video is transported over the Internet, all the above rate control schemes could not work well since they do not adapt to network bandwidth and packet-loss conditions that vary from time to time. Thus, the available resources could not be efficiently utilized and sometimes they may suffer from heavy congestion.

It would be an advance in the art to devise a multimedia streaming TCP-friendly transport protocol that can adaptively estimate the network bandwidth and smooth the sending rate. It would also be an advance in the art to devise a global resource allocation control mechanism that maximizes the quality of AV streams delivered across fairly congested connections, where bits are allocated dynamically according to the media encoding distortion and network degradation. With respect to multiple video objects, it would be an advance in the art to devise a rate control scheme that uses such a multimedia streaming TCP-friendly protocol while minimizing the overall distortion under the constraint that the total rate for all objects is upper-bounded by a target bit rate. Finally, an advance in the audiovisual streaming art would be achieved by minimizing the end-to-end distortion for a given network traffic condition and picture quality requirement.

BRIEF SUMMARY OF THE INVENTION

The resource allocation architecture allocates resources among multiple media streams over a network (such as the Internet) to achieve optimized end-to-end quality of service. Examples of the media include audio, MPEG/H.26x compressed video, mesh, compressed image, and so forth. The resource allocation architecture copes with packet drops and fluctuating available bandwidth. From the network congestion control viewpoint, the architecture allows a multimedia streaming TCP-friendly protocol, which is suitable for multimedia streaming. From the visual quality control viewpoint, the architecture provides a way to maximize the visual quality for all streams based on the variable available bandwidth and the characteristics of each of the multiple media streams. The resource allocation architecture thereby enables the user to gain globally optimized quality at the client side.

A method is disclosed for transmitting a mixed media data stream, including audio and multiple video objects (MVOs), between a sender and a receiver through a connection over a network. The transmission characteristics of the connection between server and receiver are monitored and the available bandwidth is estimated at the sender based upon the transmission characteristics of the connection monitored at the receiver side. A global buffer is allocated for the mixed media data stream to be transmitted from the sender to the receiver as a function of the estimated available bandwidth at the sender. A portion of each Video Object Plane (VOP) in the global buffer is pre-encoded with respect to a quantization parameter (QP) of the VOP. The MOP in the global buffer is then encoded based on the QP. An update is performed to a rate distortion model based upon the QP and a frame skipping function is performed after the VOP encoding. The sender then transmits the encoded video object plane in the global buffer at a regulated sender transmission rate from the sender as a function of the estimated available bandwidth at the sender.

In one implementation, a multimedia streaming TCP-friendly transport protocol is used to adaptively estimate the network bandwidth and smooth the rate at which a server sends streaming data to a receiver. A global resource allocation control mechanism is also implemented. This allocation control maximizes the quality of audio-visual (AV) streams delivered across congested connections, where bits are allocated dynamically to a global buffer for transmission over a network. This dynamic bit allocation is made in a manner that minimizes the media encoding distortion and network degradation.

In an implementation dealing with multiple video objects, a rate control scheme uses a TCP-friendly protocol that minimizes the overall distortion under the constraint that the total rate for all objects is upper-bounded by a target bit rate. The TCP-friendly protocol is used to obtain network characteristics, including packet-loss rate, delay and jitter, Network characteristics are used to estimate available network bandwidth and to make adjustments to the sending rate in a smooth, non-erratic manner. The sending rate control scheme implemented herein allows the target bit rate and global buffer size to be dynamically adapted to the estimated available network bandwidth. Additionally, the packet-loss rate is taken into account when calculating the overall distortion.

In each implementation, end-to-end distortion is minimized for network traffic conditions and picture quality requirements.

DETAILED DESCRIPTION OF THE PREFERRED EMBODIMENTS

The following discussion describes a system and method to allocate network resources among multiple media streams. These network resources are allocated within a client-network-server framework (such as the Internet) in a TCP-friendly manner to achieve optimized end-to-end quality of service. Simulation results are given that depict an implementation of the allocation of network resources to yield optimized end-to-end quality of service. A final discussion is then presented of an implementation of a network adaptive rate control scheme, including the results of a simulation of the same.

1. Framework for Internet Audio-Visual Streaming

Figure 1:
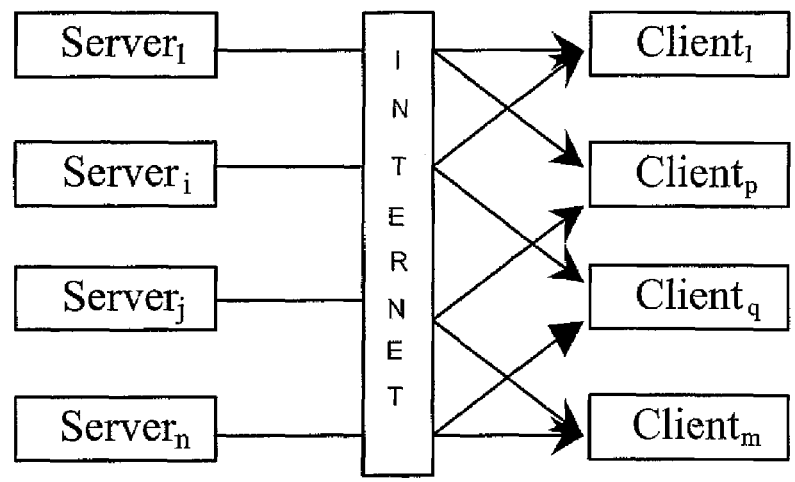
FIG. 1 depicts a general architecture where several continuous media servers play back AV streams for heterogeneous clients on demand over the Internet, where each server is able to support a large number of requests simultaneously, and where each client is able to request services from different servers.

In media streaming, multiple servers and multiple clients are usually employed in the same session. FIG. 1 depicts a general architecture where several continuous media servers play back AV streams for heterogeneous clients on demand, in which $Server_1$, $Server_i$, $Server_j$, $Server_n$ are in communication with $Client_1$, $Client_p$, $Client_q$, and $Client_m$ through the Internet. Each server is able to support a large number of requests simultaneously and each client is able to request services from different servers.

Figure 2:
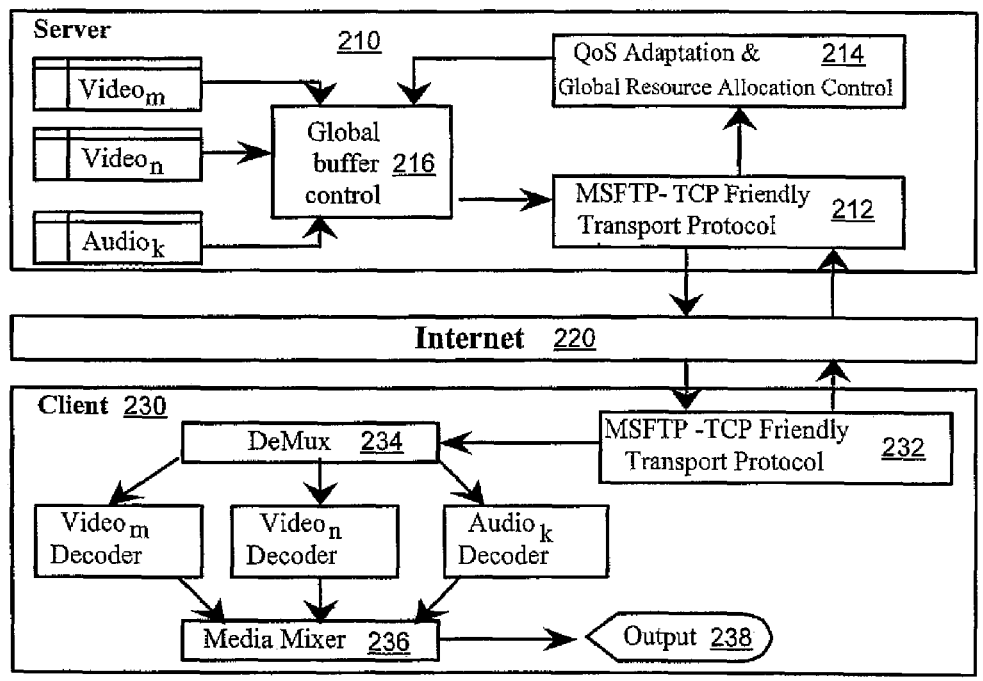
FIG. 2 depicts an end-to-end framework for media streaming over the Internet.

FIG. 2 depicts an implementation of an end-to-end framework for media streaming over the Internet seen at reference numeral 220. End-to-end transport control is adopted by using a Multimedia Streaming TCP-Friendly Protocol (MSTFP) seen at reference numerals 212 and 232. The MSTFP protocol is a rate-based TCP-friendly protocol that continuously monitors the connection between sender and receiver, which are depicted in FIG. 2, respectively, as Server 210 and Client 230. The results of the continuous monitoring of the connection are then used to regulate the bit transmission rate of Server 210.

A Quality of Service (QoS) Adaptation and Global Resource Allocation Control module 214 adjusts the quality of the bit stream that is transmitted from server 210 to client 230 through Internet 220. Module 214 periodically estimates the available bandwidth from the MSTFP protocol as derived from module 212. Combining this information with the media characteristics of media streams $Video_m$, $Video_n$, and $Audio_k$, module 214 adjusts the quality of the total transmitted streams by resource re-allocation in a Global Buffer Control module 216 at Server 210. Data occupying the global buffer is transmitted from Server 210 in the MSTFP protocol at module 212 through Internet 220 to Client 230.

Client 230 processes the MSTFP protocol at module 232 and passes the media to a demultiplexer module seen in FIG. 2 at reference numeral 234. Demultiplexer module 234 demultiplexes the combined stream into original media types for decoding at $Video_m$ decoder, $Video_n$ decoder, and $Audio_k$ decoder. The output from the video and audio decoders are mixed at a Media Mixer module 236 and output to an output device 238, such as a personal computer at Client 230 having a display device and having a sound card with associated speakers.

A discussion of the MSTFP protocol follows. Then, two exemplary implementations that use the MSTFP protocol are set forth. The first implementation is a resource allocation scheme for audio-visual streaming that is discussed in conjunction with the example illustrated in FIG. 2. The second implementation is a network adaptive sending rate control scheme that is discussed in conjunction with the example illustrated in FIG. 9. Both implementations will be discussed conceptually and in a presentation of results obtained by respective experimentations of each.

2. Multimedia Streaming TCP-Friendly Transport Protocol (MSTFP)

To transmit the video and audio streams over the Internet, the characteristics of packet-loss and bandwidth fluctuation should be taken into account. The multimedia streaming TCP-friendly protocol (MSTFP) intends to minimize the number of future packets likely to be dropped and then smoothes the sending rate. Integral to the MSTFP protocol is the underlying TCP model taught by Padhye et al. which allows the sender to change its sending rate based on the observed packet-loss rate, round trip times, and retransmission time-outs. The two main characteristics of the MSTFP protocol are "TCP-friendliness" and "rate smoothness".

The MSTFP protocol involves sender-side data packets and receiver-side control packets. The sender sends data packets to the receiver at a certain rate. The header of the sender-side packet includes the packet sequence number, a timestamp indicating the time when the packet is sent (ST1), and the size of the sending packet. The receiver sends feedback to the sender at regular intervals. The receiver-side packet includes the time interval that the packet spent in the receiver side ($\Delta RT$), the timestamp of the packet sent from the sender (ST1), the estimated packet-loss rate, and the rate at which data is received. Based on the receiver's feedback, the sender uses the TCP model taught by Padhye et al. to adjust its sending rate in a TCP-friendly manner.

What follows is a discussion of packet-loss rate estimation, round trip time estimation (RTT), retransmission time-out estimation (TO), available bandwidth estimation, and sending rate adjustment, each of which apply to the MSTFP protocol. The MSTFP protocol is preferred for the resource allocation implementation for audio-visual streaming and for the network adaptive sending rate control implementation.

A. Packet-loss Rate Estimation

Figure 3:
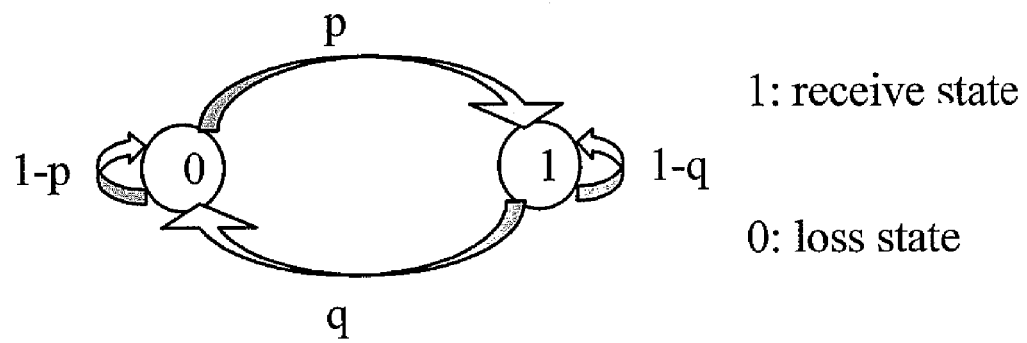
FIG. 3 depicts the Gilbert Model which is able to capture the dependence between consecutive packet-losses, and wherein "1" is the received state and "0" is the loss state.

A two-state Markov Model (Gilbert model) is used to model the packet-loss in the network. FIG. 3 depicts the Gilbert Model, wherein "1" is the received state and "0" is the loss state. This model is able to capture the dependence between consecutive losses. Network packets can be represented as a binary time series, $\{x_i\}_{i=1}^n$, where $x_i$ takes 1 if the ith packet has arrived successfully and 0 if it is lost. The current state, $X_i$, of the stochastic process depends only on the previous value, $X_{i-1}$. The transition probabilities between the two states are calculated as follows:

$$p = P[X_i = 1 | X_{i-1} = 0] \text{ and } q = P[X_i = 0 | X_{i-1} = 1]. \quad (2)$$

The maximum likelihood estimators of p and q for a sample trace are:

$$\hat{p} = n_{01}/n_0 \text{ and } \hat{q} = n_{10}/n_1, \quad (3)$$

where $n_{01}$ is the number of times in the observed time series when 1 follows 0 and $n_{10}$ is the number of times when 0 follows 1. $n_0$ is the number of 0s and $n_1$ is the number of 1s in the trace.

The probability of the event that the trace is in the loss state is given by:

$$P_L = \frac{\hat{q}}{\hat{p} + \hat{q}}. \quad (4)$$

To obtain an accurate and stable measurement of the packet loss rate, the scheme uses a filter that weights the n (n=8 in this implementation) most recent packet loss rate values in such a way that the measured packet loss rate changes smoothly. Thus, the estimated packet loss rate in the ith time interval is calculated as:

$$P_{L,i} = \sum_{j=0}^{n-1} (w_j \times \overline{P_{L,i-j}}) \quad (5)$$

where $\overline{P_{L,i-j}}$ is the measured packet loss rate in the (i−j)th time interval.

It can be seen that the weighting parameters values, wj, used in calculating the packet loss rate determines the protocol's speed in responding to changes in the level of congestion. Two sets of weighting parameters are defined in this implementation, which are denoted as WS1 and WS2, respectively.

|     | W0  | W1  | W2  | W3  | W4  | W5  | W6  | W7  |
| --- | --- | --- | --- | --- | --- | --- | --- | --- |
| WS1 | 1.0 | 1.0 | 1.0 | 1.0 | 0.8 | 0.6 | 0.4 | 0.2 |
| WS2 | 1.2 | 1.2 | 1.0 | 1.0 | 0.8 | 0.5 | 0.3 | 0.1 |

In the above two parameter sets, WS1 is used in the default cases. When the most recent packet loss rate is less than the half of the calculated packet loss rate, WS2 is adopted to concentrate more of the relative weight on the most recent packet loss rate.

B. RTT and TO Estimation

Based on the receiver's feedback packet, the sender can adjust the current RTT using the following equation:

$$RTT = \alpha \times \overline{RTT} + (1-\alpha) \times (\text{now} - ST1 - \Delta RT), \quad (6)$$

where $\overline{RTT}$ is the current round trip time, RTT is the estimated round trip time, now is the timestamp indicating the time at which the packet was received in the sender, and α is a weighting parameter that is set to 0.75 to smooth the variation for the purposes of this implementation.

After calculating the RTT, retransmission timeout can be defined as:

$$TO = RTT + (k \times RTTVAR), \quad (7)$$

where k is a constant that is recommended to take the value 4, RTT is the estimated round trip time of the sender packet from the sender to the receiver, and RTTVAR is a smoothed estimate of the variation of RTT. RTTVAR in Eq. (7) can be represented as:

$$RTTVAR = \alpha_2 \times \overline{RTTVAR} + (1-\alpha_2) \times |RTT - (\text{now} - ST1 - \Delta RT)|. \quad (8)$$

In. Eq. (8), $\overline{RTTVAR}$ is the current variation in the round trip time of the sender packet from the sender to the receiver (RTT), α2 is a weighting parameter that is preferably set to 0.75, and RTTVAR is a smoothed estimate of $\overline{RTTVAR}$.

C. Available Bandwidth Estimation

After the above procedures, the sender can estimate the present available network bandwidth as taught by Padhye et al. who calculate the present available network bandwidth as follows:

$$rcvrate = \frac{PacketSize}{RTT \times \sqrt{2P_L/3} + 3 \times TO \times P_L \times \sqrt{3P_L/8} \times (1 + 32P_L^2)}, \quad (9)$$

where PacketSize is the size of the sending packet and TO is a Time Out period that indicates the length of a time interval before which a sender should wait before re-transmitting a packet of data. As taught by Padhye et al., the present implementation proposes a TCP protocol that calculates TO without re-transmitting the data.

D. Sending Rate Adjustment

After estimating the available network bandwidth, the sender can dynamically adjust its sending rate. TCP congestion control is based on Additive Increase/Multiplicative Decrease (AIMD), which is independent of the lost fraction and adjusting interval. An alternate way to change the sending rate related to current packet-loss is described as:

if (rcvrate>$\overline{currate}$) multi=(now−lastchange)/RTT constraint multi from 1 to 2 currate=
$\overline{currate}$+(PacketSize/RTT)×multi  (10)

else currate=β×rcvrate+(1−β)×currate where $\overline{currate}$ is the present sending rate, currate is the updated sending rate, lastchange is the timestamp indicating the time at which last adjustment occurred, and β is the weighting parameter that is set to 0.75 in this implementation. An advantage of the above scheme is that the sending rate can be increased dramatically to the available bandwidth, and in the meanwhile the rate can be decreased smoothly. In other words, the MSTFP protocol has less variation in the transmission rate and is less sensitive to random loss caused by channel error.

3. Resource Allocation for Audio-Visual Streaming

What follows is a discussion of an implementation of a resource allocation scheme for audio-visual streaming and a presentation of the results of simulations of the same.

A. Discussion

Dynamic resource allocation is preferable for distributed multimedia systems that support application-level control. In the example illustrated in FIG. 2, dynamic resource allocation can be implemented by integrating global buffer control 216 with Quality of Service Adaptation and Global Resource Allocation Control 216 using dynamic network bandwidth estimation. Dynamic network bandwidth estimations are made using the changing characteristics of Internet 220 learned at modules 212 and 232 using the MSTFP protocol. One of the most challenging tasks of dynamic resource reallocation is global coordination of the feedback information from multiple streams.

Different applications, such as file-transfer, web browsing, and AV streaming, have different tolerances that can be mismatched between the sending rate and the network bandwidth. For example, file-transfer has no real-time constraints and is tolerable to delay. The difference between the sensitivities to human aura and visual systems indicates the audio and video should be handled differently when adverse conditions arise, thereby affecting the playback of media streams. It is well known that the aural sense is more sensitive to disturbances than the visual sense. Therefore, it is appropriate to assign higher priority to audio data than video data. If data can be discarded when congestion occurs in the network, it is preferable to discard video data first.

In general, the objective of resource allocation is to minimize the overall distortion under the total bit-rate constraint. If the sending rate of the ith media stream is denoted as $r_i$, the distortion of ith media as $d_i$, and the quality-impact parameter of this stream as $\alpha_i$, then a minimization of the distortion can be expressed as:

$$\text{Minimize } D = \sum_i \alpha_i \times d_i, \text{ subject to } R = \sum_i r_i \leq R_T, \tag{11}$$

where $R_T$ is the total bit budget for the current time instant obtained from the MSTFP protocol, i.e., $$R_T = \sum_i currate_i. \tag{12}$$

In the resource allocation scheme disclosed below, the main focus is on global buffer control and bandwidth allocation, where a global buffer is used to control the bit rate allocation. Using the MSTFP protocol the current available network bandwidth $R_T$, can be estimated. Together with the number of bits spent in the global buffer in the previous time instant $B_{prev}$, the size $R_{old}/2$, and the occupancy of the global output buffer $W_{prev}$ in the previous time instant, the target rate and global buffer can be updated for each time interval. The output target rate of the joint buffer control is allocated among each stream to yield the target bit for an individual object. As the buffer size $R_{old}/2$ is changed to $R_T/2$, the occupancy of the buffer is changed as follows:

$$W_{cur} = \max(((W_{prev} + B_{prev}) \times R_T/R_{old} - R_T/F), 0), \tag{13}$$

where "F" is the video frame rate (e.g., 20 frame/second, 30 frame/second, etc.)

To achieve the global minimal distortion among the multiple streams, it is desirable to define the appropriate function for rate and distortion.

To predict the number of bits that is used to encode the current stream for video objects, a quadratic function calculation is used that is taught by Chiang et al., and is given by:

$$r_i = \frac{p_{i1} \times MAD_i}{Q_i} + \frac{p_{i2} \times MAD_i}{Q_i^2} \tag{14}$$

Verscheure et al. teach that packet-loss has an impact on video quality. For video distortion measuring, the present implementation considers the packet-loss that occurs during video transmission. The video quality will drop quickly as the packet-loss rate and the sending rate go up.

To take the packet-loss into account, the implementation uses another quadratic function to estimate the distortion that is given by:

$$d_i = q_{i1} \times Q_i + q_{i2} \times Q_i^2 + q_{i3} \times r_i \times P_{Li}. \tag{15}$$

In the audio case, one could still use the above distortion and rate control algorithms, respectively, in Eqs. (14) and (15). In Eq. (14), $MAD_i$ is the energy for the audio case.

Having the information of the rate and distortion, distortion can be minimized by Lagrange optimization to obtain the appropriate quantization parameters. These estimated quantization parameters are used in the encoding process.

B. Simulation Results

MPEG-4 streams with multiple video objects were used in a simulation to demonstrate the effectiveness of an implementation of the network resource allocation scheme for audio-visual streaming. MPEG-4 is an object-based video coding standard in which a visual scene is typically composed of Video Objects (VOs). Each VO is individually coded to give rise to an elementary bit stream that can be individually accessed and-manipulated. The composition information is sent in a separate stream. For multiple video object streams, foreground objects receive most attention from the viewer, while background objects are of less importance. In addition, foreground objects usually change rapidly, while background objects change slowly. Therefore, they may have different impact on the overall video quality.

In the simulation, the Network Simulator (NS) version 2 software was used to study the MSTFP protocol and the resource allocation mechanism for the MPEG-4 multiple video objects. The main tasks of the simulation were to select appropriate network topologies, effectively model the background traffic, and define proper performance metrics.

Figure 4:
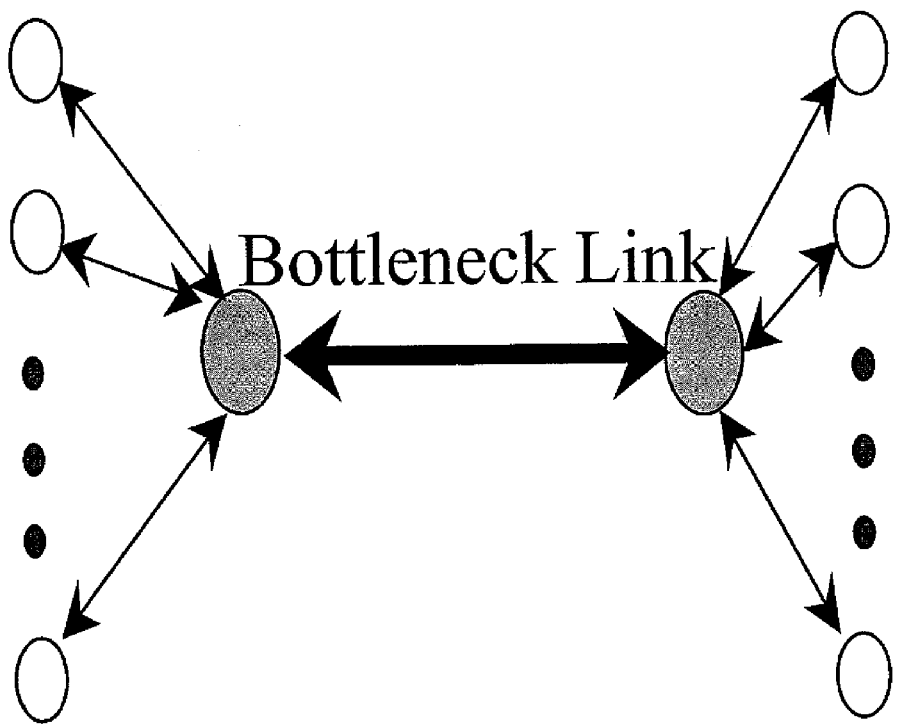
FIG. 4 illustrates a topology used in a simulation of an implementation of a resource allocation scheme.

FIG. 4 is a topology used in the simulation. The topology has a single shared bottleneck link. The sources or senders are on one side of the link in FIG. 4 and the receivers are on the other side. All links except the bottleneck link are sufficiently provisioned to ensure that any drops/delays that occurred are only caused by congestion at the bottleneck link. All links are drop-tail links. In the simulation, the background traffic has infinite-duration TCP-like connections and infinite-duration real-time adaptive protocol (RAP) connections that were proposed by Rejaie et al. [*SIGCOM*] to deliver real-time traffic over Internet.

As used herein, "friendliness" metrics are used as follows. $k_m$ denotes the total number of monitored MSTFP protocol connections and $k_t$ denotes the total number of monitored TCP connections. The throughputs of the MSTFP protocol connections are further denoted as $T_1^m, T_2^m, \ldots, T_{k_m}^m$ and the throughputs of the TCP connections as $T_1^t, T_2^t, \ldots, T_{k_j}^t$. Then the average throughputs of the MSTFP protocol and TCP connections are respectively defined as follows:

$$T_M = \frac{\sum_{i=1}^{k_m} T_i^m}{k_m} \text{ and } T_T = \frac{\sum_{i=1}^{k_1} T_i^t}{k_t}. \quad (16)$$

As such, the "friendliness" ratio can be defined as:

$$F = T_M/T_T. \quad (17)$$

To verify "rate smoothness" for the MSTFP protocol connections, let $R_{m_i}^1, R_{m_i}^2, \ldots, R_{m_i}^{Sm}$ represent the sending rates at different time instances $1, 2, \ldots, s_m$ of the ith MSTFP protocol connection and $R_{t_k}^1, R_{t_k}^2, \ldots, R_{t_k}^{S_i}$ represent those of the kth TCP connection, then the sending variation of the MSTFP protocol connections and the TCP connections are respectively defined as:

$$\Delta_{M_i} = \sum_{j=1}^{sm} |R_{m_i}^j - R_{m_i}^{j-1}| \text{ and } \Delta_{T_k} = \sum_{j=1}^{st} |R_{t_k}^j - R_{t_k}^{j-1}|. \quad (18)$$

The smoothness ratio is defined as $$S = \Delta_{M_i}/\Delta_{T_k}. \quad (19)$$

By way of example, when $S \geq 1$ then the kth TCP connection is smoother than the ith MSTFP protocol connection.

Figure 5:
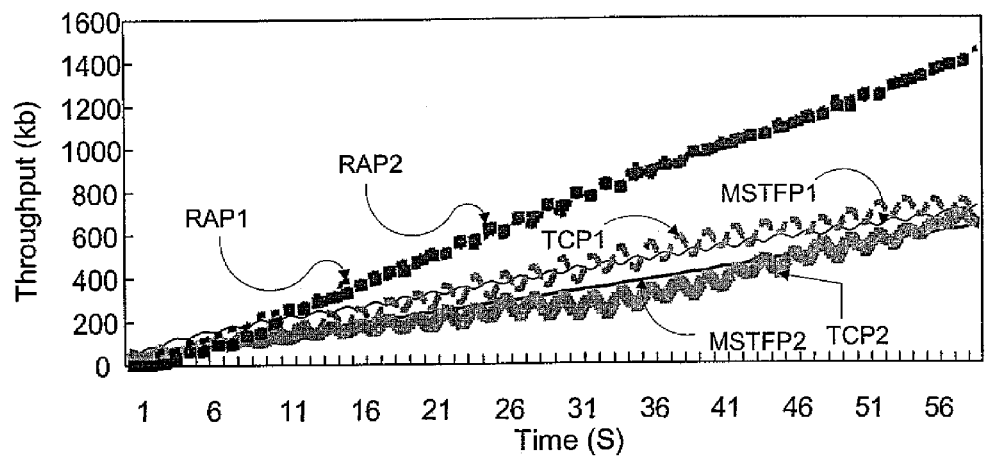
FIGS. 5 and 6 show simulation results of the throughput and sending rate, respectively, for six (6) different connections with their respective times.
Figure 6:
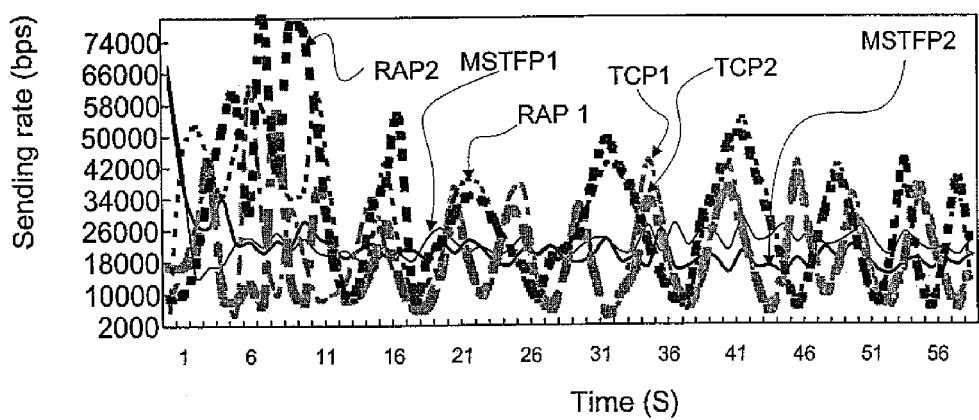

FIG. 5 shows the simulation results of the throughput as measured in Kb with respect to time measured in seconds for six (6) different connections. The data points for FIG. 5 are listed in the Appendix. Two connections were used in an implementation of the MSTFP protocol (MSTPF1, MTPF2), two connections were the TCP protocol (TCP1, TCP2), and two connections (RAP1, and RAP2) were the Real time Adaptive Protocol (RAP) taught by Rejaie et al [*SIGCOM*]. The sending rates were measured in bps with respect to time. The six (6) different connections are illustrated in FIG. 6. The data points for FIGS. 5 and 6 are listed in the Appendix, below. From FIGS. 5 and 6 it can be seen that the MSTFP protocol disclosed herein is more 'friendly' to TCP than RAP and also smoother than TCP and RAP.

The simulation used the MPEG-4 test sequence "coast guard" to illustrate the performance of the resource allocation scheme. The coast guard test sequence includes four objects—river (obj0), boat (obj1), yacht (obj2), and riverbank (obj3). The four objects were coded in CIF at a temporal resolution of 10 fps. In the simulation, the quality-impact parameter for these objects was selected as 0.7, 1.2, 1.2, and 0.7, respectively. The bottleneck link bandwidth (kb) is set to 100, 140, 100, 80, 100, 140, 100, 80, 100, and 140 to respectively correspond to time (ms) 0, 500, 1000, 1500, 2000, 2500, 3000, 3500, 4500, and 5000.

Figure 7:
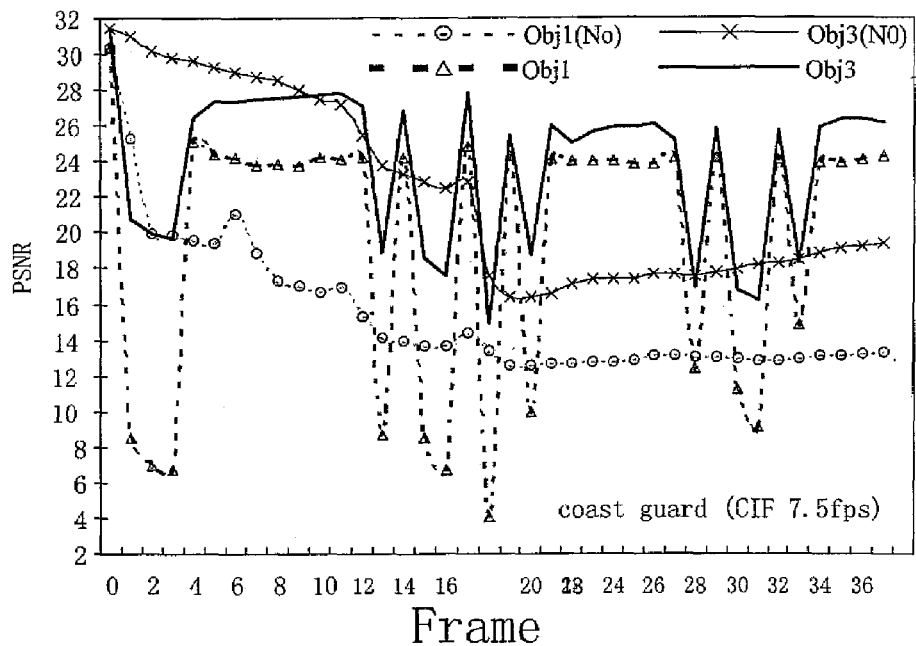
FIG. 7 is a plot of peak signal to noise ratio (PSNR) per frame of different video objects, wherein the plot is illustrated with and without the disclosed resource allocation control scheme.

The test sequence plotted in FIG. 7, the data points for which are listed in the Appendix, shows the PSNR per frame of different objects. The thick line illustrates the resource allocation control scheme and the thin line is an illustration without the network resource allocation control scheme. FIG. 7 illustrates coding at CIF 7.5 Frames Per Second (FPS) using the MPEG-4 test sequence "Coast Guard" but, for the benefit of clarity, illustrates only the simulation results of obj1 and obj3.

Figure 8:
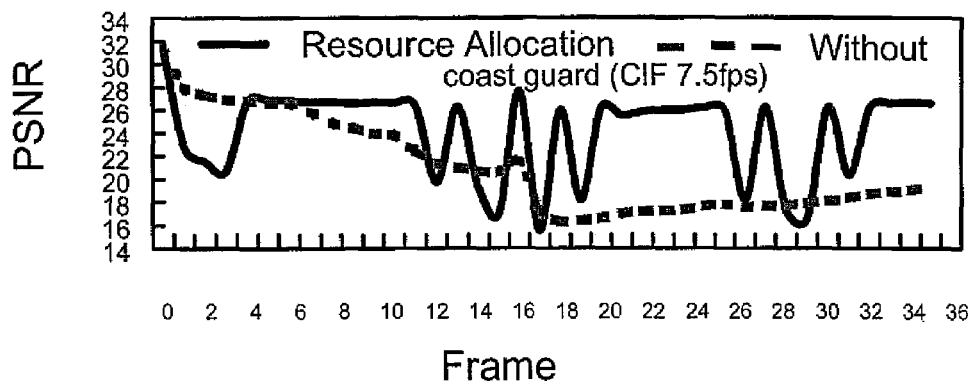
FIG. 8 is a plot of the PSNR per frame using two of the four objects in the MPEG-4 test sequence "Coast Guard", wherein the plot is illustrated with and without the disclosed resource allocation control scheme.

FIG. 8 shows plots of the PSNR per frame coded at CIF 7.5 Frames Per Second (FPS) and using the MPEG-4 test sequence "Coast Guard". The data points for FIG. 8 are listed in the Appendix, below. An implementation of the resource allocation control scheme is seen in a solid line and the dashed line illustrates a rate control scheme without this implementation. Note that there are several sharp drops in the resource allocation control scheme due to frame skipping. Furthermore, it can be seen that during the period of no frame skipping, the resource allocation control scheme has a higher PSNR. It can be seen in FIG. 8 that, even taking the skipped frames into consideration, the implementation of the resource allocation control scheme achieves a better video quality. The data points for FIG. 8 are listed in the Appendix, attached hereto.

Table 1 shows a comparison of the results with and without the MSTFP protocol resource allocation scheme disclosed herein. The multiple video streams for the MPEG-4 test sequence "coast guard" were used to produce the results seen in Table 1 for each of the four objects—river (obj0), boat (obj1), yacht (obj2), and riverbank (obj3).

TABLE 1

| Resource control scheme | Obj0 | | Obj1 | | Obj2 | | Obj3 | | Average PSNR |
|---|---|---|---|---|---|---|---|---|---|
| MSTFP Resource allocation | W 0.7 | PSNR 24.64 | W 1.2 | PSNR 19.52 | W 1.2 | PSNR 19.91 | W 0.7 | PSNR 23.99 | 24.16 |
| Without control | | PSNR 24.23 | | PSNR 15.45 | | PSNR 18.12 | | PSNR 22.30 | 20.99 |

4. Network Adaptive Rate Control Scheme

Figure 9:
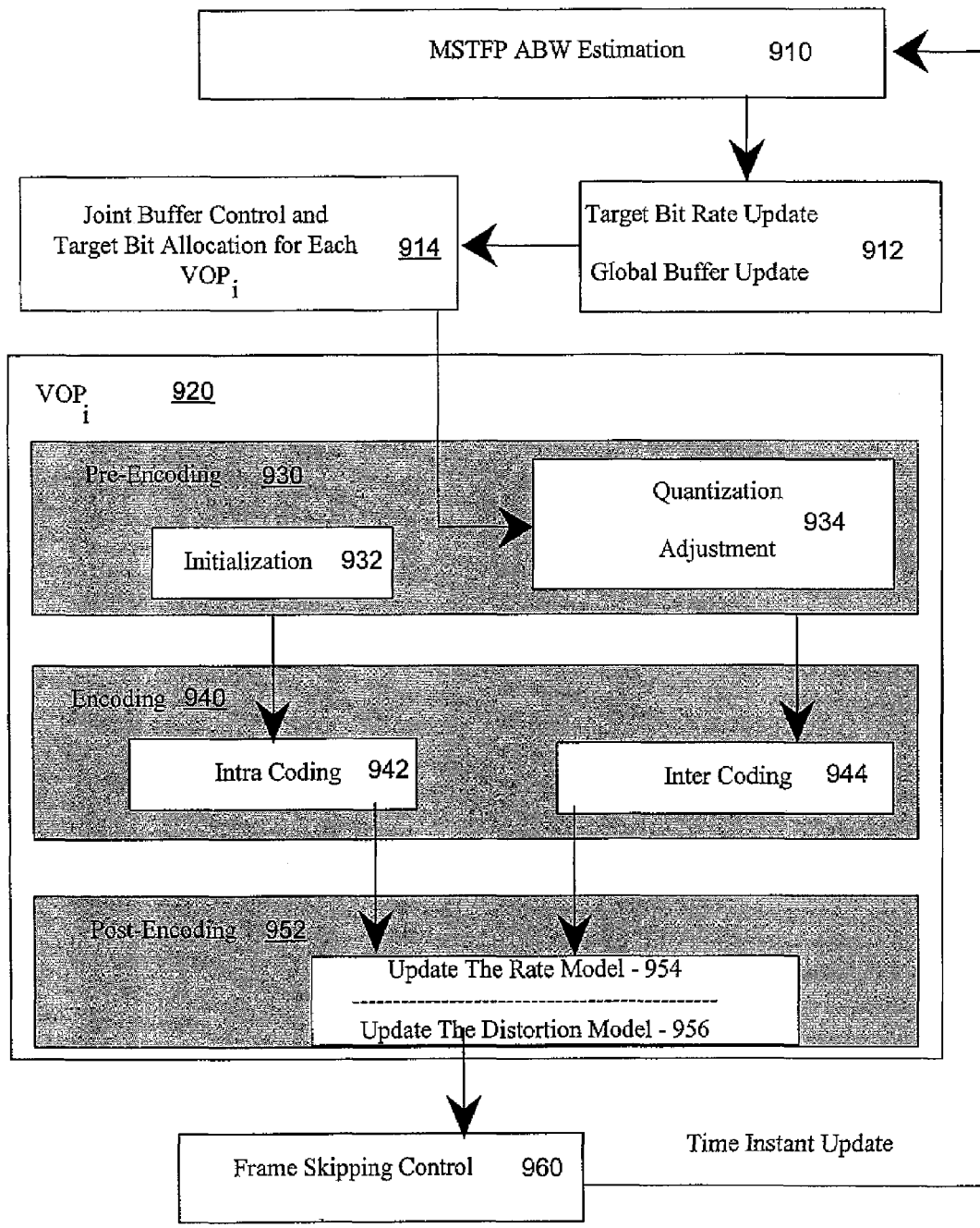
FIG. 9 shows a block diagram of the network resource allocation scheme disclosed herein for multiple video objects (MVOs).

An implementation of a network adaptive rate control scheme will now be presented in conjunction with the example illustrated in FIG. 9. Also, the results of a simulation of an example of a network adaptive rate control scheme are set forth.

A. Discussion

The Network Adaptive Rate Control (NARC) scheme disclosed herein achieves minimal distortion in a global scene. Specifically, an overview is first given of an implementation of the NARC scheme, followed by a focus upon a quantizer adjustment of the NARC scheme.

FIG. 9 shows a block diagram of the NARC scheme for multiple video objects (MVOs). The block diagram depicts a flow chart for the calculation of an estimate of the MSTFP available bandwidth that is made at module 910 of FIG. 9.

Unlike the prior art rate control schemes taught by Chiang et al. and Vetro et al., implementations of the MVOs NARC scheme includes features such as dynamically estimating the available bandwidth at module 910, the target rate and global buffer updating at module 912, quantization adjustment at module 934, and frame skipping control at module 960. Functionalities of these modules are discussed below.

The MVOs NARC scheme illustrated in FIG. 9 includes five stages, each of which will now be described. In the first stage, illustrated generally at module 910, the current available network bandwidth ($R_T$) is estimated in accordance with the MSTFP protocol. Together with the number of bits spent in the previous time instant ($B_{prev}$), the size ($R_{old}/2$) and the occupancy ($W_{prev}$) of the encoder output buffer, the target rate and global buffer are then updated for each Video Object Plane ($VOP_i$) frame at module 912. The output total target bits from the joint buffer control are allocated among each Video Object Plane ($VOP_i$) at module 914 to yield the target bits for each individual object. As the buffer size, $R_{old}/2$, is changed to $R_T/2$, the occupancy of the buffer, $W_{cur}$, is changed as follows:

$$W_{cur} = \max((W_{prev} + B_{prev}) \times R_T/R_{old} - R_T/F), 0, \quad (20)$$

where "F" is the video frame rate (e.g., 20 frame/second, 30 frame/second, etc.)

In the second stage, which is the pre-encoding part seen generally at reference numeral 930, the quantizer of each $VOP_i$ is adjusted. Chiang et al. teach that the relationship between the quantization parameter (QP) and the texture value can be described as $$r = \frac{p_1 \times MAD}{QP} + \frac{p_2 \times MAD}{QP^2}, \quad (21)$$

where $p_1$ and $p_2$ are control parameters. In the pre-coding part, initialization of the control parameters $p_1$ and $p_2$ takes place at initialization module 932. In order to maintain a constant quality of the total video sequence, the QP of each $VOP_i$ is limited to the range from 1 to 31, depending upon the bandwidth. The QP is allowed to change within a pre-defined range compared with the previous QP. A QP of 1 reflects the best quality and 31 represents the worst quality.

The Quantization Adjustment module 934 performs functions that contribute towards a global reduction in distortion. To achieve the global minimal distortion among the MVOs, the implementation of the MVOs NARC scheme employs the quadratic function to predict the number of bits, $r_i$, which will be used to encode the ith VOP:

$$r_i = \frac{(p_1)_i \times MAD_i}{QP_i} + \frac{(p_2)_i \times MAD_i}{QP_i^2}. \quad (22)$$

Still another quadratic function proposed by Chiang et al. is used to estimate the distortion, and is given by:

$$d_i = (q_1)_i \times QP_i + (q_2)_i \times QP_i^2, \quad (23)$$

where $q_1$ and $q_2$ are control parameters.

Verscheure et al. teach that packet-loss has an impact on video quality. A rate control implementation disclosed herein takes into consideration the packet-loss that occurs during video transmission. Video quality deteriorates quickly as the packet-loss rate and the sending rate go up.

To take the packet-loss into account, Eq. (23) is modified to:

$$d_i = (q_1)_i \times QP_i + (q_2)_i \times QP_i^2 + (q_3)_i \times r_i \times (P_L)_i, \quad (24)$$

where $q_3$ is the additional control parameter.

The objective of a rate control is to minimize the overall distortion to obtain the optimized quality for the whole video frame. Such a minimization can be expressed as:

$$\text{minimize } D = \sum_i d_i, \text{ subject to } R = \sum_i r_i \leq R_T, \quad (25)$$

where $R_T$ is the total bit budget for the current time instant obtained from the buffer control algorithm and the MSTFP protocol. The third stage, seen generally in FIG. 9 at reference numeral 940, performs an encoding process based upon the quantization parameter (QP) estimate from the second stage, above. The "Intra coding" at module 944 receives the QP from pre-encoding Quantization Adjustment module 934 and is directed to the I-picture frame. The Quantization Adjustment module 934 is discussed further below. The "Inter coding" at module 942 receives initialized values from a pre-coding initialization module 932 and is directed to the P-picture frame or the predicted picture. Both "Intra coding" module 944 and the "Inter coding" at module 942 pass I-picture frames and P-picture frames, respectively, to the post encoding fourth stage seen generally at reference numeral 952 in FIG. 9.

In the fourth stage, the rate model is updated at module 954. The objective of a rate control is to minimize the overall distortion. The update to the distortion model is performed at module 956. The rate and distortion models are updated based on the encoding results of the current frame as well as those from a specified number of the previous frames. Both the rate and the distortion aspects of the rate and distortion models are functions of the quantization parameter (QP) from Eq. 21 and the probability that the trace is in the loss state ($P_L$) from Eq. 4. The update to the rate and distortion models can be done using the least squares procedure described by Eckert et al.

The fifth stage is a frame skipping module 960 in FIG. 9. In the fifth stage, frame skipping occurs after all the video objects (VOs) in the scene have been encoded. Frame skipping occurs at this point in the implementation because, when the global scene is considered, all the VOs composed within the same scene should be encoded at the same frame rate. For the purpose of frame skipping, the P-picture frame has a lower priority and the I-picture frame has a high priority. As such, the P-picture frame will preferably be the frame that is chosen to be skipped.

B. Simulation Results

Figure 10:
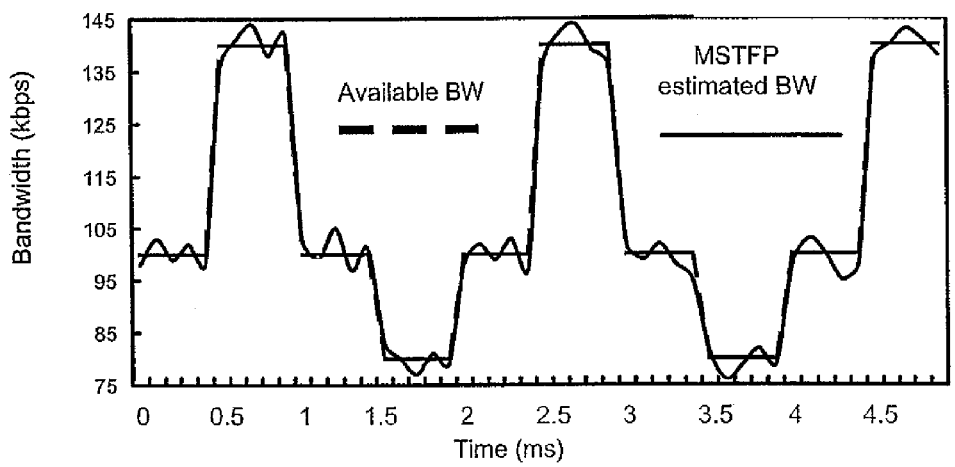
FIG. 10 shows the simulation results of the network available bandwidth and its estimation in a network conditions plot of bandwidth against time, wherein these two curves depict the real available bandwidth values and the estimated values obtained by using the multimedia streaming TCP-friendly transport protocol.

To illustrate the bandwidth adaptation ability of an implementation of the NARC scheme, a simulation was conducted of the MSTFP protocol using the Network Simulator (NS) software version 2. The results of the simulation are illustrated in FIG. 10 and the data points therefore are listed in the Appendix. FIG. 10, discussed below, demonstrates that given a variable available bandwidth, the MSTFP protocol can dynamically adjust the sending rate to match up with the available network bandwidth.

FIG. 10 depicts the available network bandwidth and its estimation in plot of bandwidth measured in kbps against time measured in ns. The available network bandwidth is illustrated in FIG. 10 as a dashed line and the MSTFP estimated network bandwidth is illustrated by a solid line.

In the simulation, a standard MPEG-4 codec was used with unrestricted motion vector modes. The simulation tested two rate control schemes: 1) the bandwidth adaptive MVOs rate control scheme disclosed herein, and 2) a conventional MPEG-4 standard MVOs rate control (Q2) without any feedback from network bandwidth and packet-loss rate. A change was made in the frame skipping part of the conventional MPEG-4 Q2 scheme so as to maintain all the objects of the same scene in a consistent frame rate. In both cases, the first frame was intracoded, and the remaining frames were interceded. The tests used the MPEG-4 "coast guard" video test sequence and the MPEG-4 "news" test video sequences, respectively. Both of them are composed of four video objects.

PSNR was used in the simulation as a metric to measure video quality. For an eight-bit image with intensity values between 0 and 255, the PSNR is given by:

$$PSNR = 20\log_{10}\frac{255}{RMSE}, \qquad (26)$$

where RMSE stands for root mean squared error. Given an original N×M image f and a compressed or degraded image f', the RMSE can be calculated as follows:

$$RMSE = \sqrt{\frac{1}{N \times M}\sum_{x=0}^{N-1}\sum_{y=0}^{M-1}[f(x, y) - f'(x, y)]^2}. \qquad (27)$$

A fair comparison of PSNR between the two rate control methods with the skipping of different frames is not trivial. A rate control technique that skips more frames would typically spend more bits per coded frame and could easily have a very high average PSNR per coded frame. Table 2, below, presents the rate control impact on video quality. The average PSNRs of the encoded frames are shown in the third column of Table 2. It can be seen from Table 2 that there is more frames skipping in the conventional MPEG-4 Q2 scheme than in an implementation of the NARC scheme.

TABLE 2

| Video Sequence | Rate control scheme | Encoded average PSNR | Skipped frame | Total average PSNR |
|---|---|---|---|---|
| Coast guard (~100 kbps) | NARC scheme | 26.02 | 20 | 23.92 |
| | MPEG-4 Q2 scheme | 27.33 | 26 | 21.89 |
| News (~100 kbps) | NARC scheme | 30.97 | 8 | 30.77 |
| | MPEG-4 Q2 scheme | 33.08 | 25 | 29.36 |

Table 2 also demonstrates that the encoded average PSNR in the conventional MPEG-4 Q2 scheme is higher than in the NARC scheme However, using the encoded average PSNR value as a measure of compressed video quality is not accurate. This is because the distortion of the non-encoded video is not taken into account. In the rate-control testing in the conventional MPEG-4 Q2 scheme, it was decided that when a frame was skipped, the previous encoded frame should be used in the PSNR calculation because the decoder displays the previous encoded frame instead of the skipped one. The average PSNR is calculated using this approach herein and the results are shown in Table 2 as the "TOTAL average PSNR" in column 5.

Figure 11:
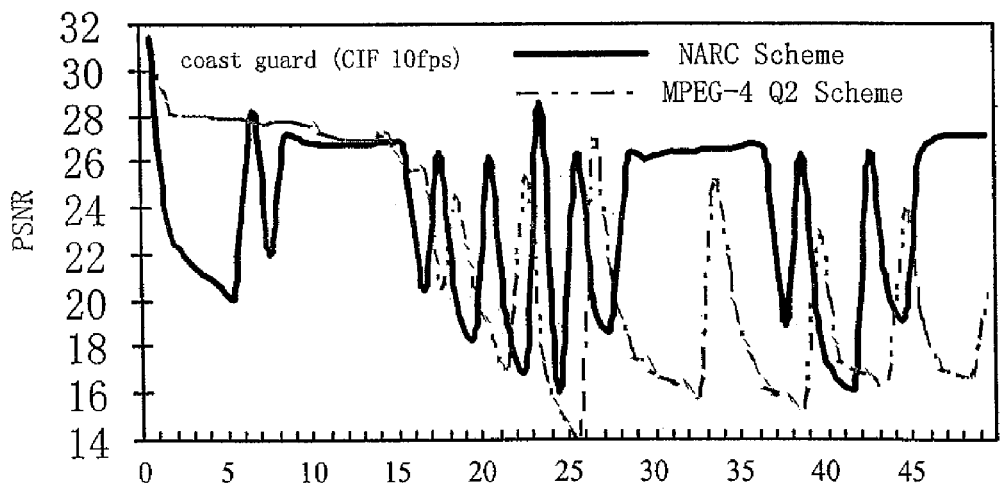
FIGS. 11 and 12 both illustrate the disclosed network adaptive rate control scheme and the convention MPEG-4 Q2 scheme, where each show a plot of PSNR per frame, where FIG. 11 uses the MPEG-4 "coast guard" test sequence, and where FIG. 12 uses the MPEG-4 "news" test sequence.
Figure 12:
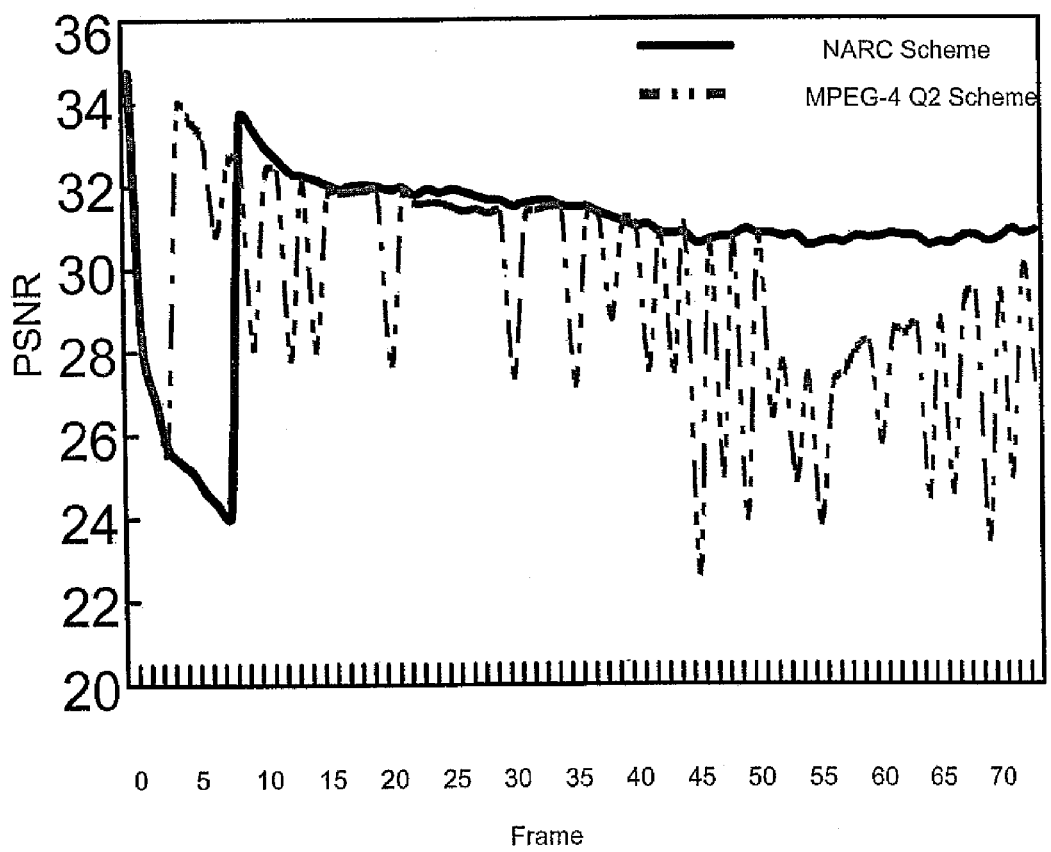

FIGS. 11 and 12 each show a plot of PSNR per frame at 10 frames per second, where FIG. 11 uses the MPEG-4 "coast guard" test sequence and FIG. 12 uses the MPEG-4 "news" test sequence. The respective data points for each of FIGS. 11 and 12 are listed in the Appendix. In FIGS. 11 and 12, the solid line illustrates an implementation of the NARC scheme and the dashed line illustrates the convention MPEG-4 Q2 scheme, The PSNR values of the tested video drops sharply due to frame skipping. FIGS. 11 and 12 illustrate that the NARC scheme significantly reduces the number of frames that are skipped. During the period when no frames are skipped in either method, the NARC scheme has a higher PSNR, and therefore video quality, than that of the conventional MPEG-4 Q2 scheme. This is because the packet-loss rate in the NARC scheme is less than that in the conventional MPEG-4 Q2 scheme.

The above-described implementations of systems and methods are presented herein in the general context of server-client architecture via the Internet. The client and server may be implemented by general-purpose computers, or by other particularly tailored computing devices, such as minicomputers, mainframe computers, workstations, Internet appliances, set top boxes, wireless communication devices, game consoles, portable computing devices, and the like.

An exemplary computer system has one or more processors, memory, and one or more input/output (I/O) devices. The processor communicates with the memory and I/O devices via one or more bus/interface mechanisms. Programs, data, files, and the like may be stored in memory and executed on the processor.

The memory typically includes both volatile memory (e.g., RAM) and non-volatile memory (e.g., ROM, Flash, hard disk, CD-ROM, DVD, etc.). Examples of possible I/O devices include a mouse, a touch pad, a joystick, a keyboard, a keypad, a display, a peripheral storage device, and a microphone. The computer system may also implement a computer operating system that is stored in memory and executed on the processor.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

Appendix

FIG. 5 - Six (6) plots of sixty (60) data points, from 1 to 60:

MSTFP1

| | | | | | | | | | |
|---|---|---|---|---|---|---|---|---|---|
| 25 | 79 | 88 | 124 | 125 | 155 | 153 | 183 | 175 | 209 | 197 |
| 228 | 218 | 248 | 239 | 271 | 255 | 289 | 277 | 312 | 302 | 336 |
| 324 | 357 | 346 | 381 | 366 | 403 | 389 | 424 | 413 | 447 | 431 |
| 467 | 451 | 489 | 471 | 508 | 492 | 529 | 511 | 549 | 529 | 568 |
| 552 | 588 | 572 | 607 | 587 | 625 | 606 | 644 | 626 | 664 | 646 |
| 684 | 667 | 703 | 688 | 725 | | | | | | |

MSTFP2

| 14 | 29 | 42 | 53 | 67 | 78 | 92 | 101 | 115 | 123 | 135 |
|---|---|---|---|---|---|---|---|---|---|---|
| 143 | 156 | 161 | 176 | 184 | 192 | 201 | 209 | 218 | 231 | 239 |
| 248 | 258 | 268 | 279 | 287 | 298 | 308 | 315 | 329 | 338 | 348 |
| 355 | 366 | 376 | 387 | 397 | 409 | 420 | 426 | 440 | 446 | 461 |
| 470 | 484 | 493 | 507 | 513 | 528 | 533 | 548 | 555 | 570 | 577 |
| 594 | 600 | 615 | 621 | 640 | | | | | | |

TCP1

| 68 | 36 | 85 | 50 | 87 | 58 | 123 | 103 | 162 | 118 | 183 |
|---|---|---|---|---|---|---|---|---|---|---|
| 141 | 198 | 149 | 239 | 169 | 261 | 205 | 297 | 253 | 330 | 261 |
| 365 | 286 | 403 | 304 | 415 | 339 | 443 | 361 | 481 | 374 | 492 |
| 423 | 531 | 427 | 558 | 471 | 584 | 495 | 600 | 533 | 628 | 542 |
| 643 | 593 | 656 | 596 | 662 | 614 | 696 | 640 | 734 | 677 | 756 |
| 680 | 756 | 680 | 756 | 681 | | | | | | |

TCP2

| 31 | 37 | 41 | 57 | 68 | 93 | 103 | 99 | 119 | 105 | 127 |
|---|---|---|---|---|---|---|---|---|---|---|
| 117 | 152 | 138 | 175 | 145 | 183 | 154 | 204 | 164 | 216 | 171 |
| 248 | 183 | 252 | 213 | 296 | 219 | 302 | 220 | 304 | 220 | 310 |
| 227 | 323 | 257 | 340 | 292 | 375 | 308 | 393 | 345 | 431 | 404 |
| 477 | 411 | 506 | 463 | 556 | 474 | 568 | 508 | 590 | 539 | 610 |
| 586 | 643 | 634 | 690 | 639 | | | | | | |

RAP1

| 1 | 1 | 63 | 63 | 104 | 113 | 136 | 169 | 176 | 234 | 240 |
|---|---|---|---|---|---|---|---|---|---|---|
| 273 | 273 | 317 | 308 | 383 | 372 | 422 | 401 | 473 | 451 | 526 |
| 501 | 571 | 538 | 607 | 586 | 665 | 633 | 730 | 684 | 794 | 771 |
| 849 | 827 | 912 | 858 | 939 | 906 | 982 | 963 | 1031 | 999 | 1064 |
| 1048 | 1116 | 1105 | 1155 | 1159 | 1220 | 1216 | 1260 | 1253 | 1292 | 1282 |
| 1341 | 1337 | 1384 | 1394 | 1455 | | | | | | |

RAP2

| 1 | 1 | 5 | 24 | 60 | 62 | 91 | 89 | 133 | 141 | 184 |
|---|---|---|---|---|---|---|---|---|---|---|
| 257 | 257 | 286 | 305 | 326 | 364 | 389 | 427 | 427 | 473 | 501 |
| 505 | 566 | 570 | 625 | 614 | 673 | 676 | 734 | 727 | 789 | 773 |
| 828 | 813 | 872 | 884 | 914 | 919 | 975 | 979 | 999 | 1026 | 1046 |
| 1056 | 1081 | 1101 | 1133 | 1143 | 1186 | 1184 | 1235 | 1232 | 1281 | 1306 |
| 1325 | 1357 | 1381 | 1391 | 1435 | | | | | | |

FIG. 6 - Six (6) plots of sixty (60) data points, from 1 to 60:

MSTFP1

| 68022 | 42745 | 14326 | 16720 | 17420 | 22844 | 24124 | 22042 | 25547 | 21249 | 23897 |
|---|---|---|---|---|---|---|---|---|---|---|
| 20511 | 19820 | 20891 | 18771 | 17810 | 20177 | 19883 | 18367 | 23842 | 26506 | 22961 |
| 20556 | 21740 | 19676 | 20867 | 24021 | 19402 | 21519 | 18487 | 21310 | 23562 | 23279 |
| 20327 | 20748 | 26960 | 20312 | 27401 | 21843 | 25885 | 24942 | 20751 | 28371 | 23268 |
| 23941 | 27077 | 22757 | 25453 | 22119 | 22617 | 24809 | 26673 | 21646 | 19403 | 25080 |
| 22281 | 20460 | 21282 | 19322 | 22834 | | | | | | |

MSTFP2

| 65151 | 38841 | 27793 | 26881 | 34153 | 22795 | 23252 | 20361 | 23289 | 22110 | 28267 |
|---|---|---|---|---|---|---|---|---|---|---|
| 24500 | 22071 | 19041 | 21058 | 22649 | 19497 | 20840 | 21043 | 18842 | 23085 | 20188 |
| 23489 | 21368 | 17728 | 17088 | 20880 | 19863 | 21691 | 18292 | 17592 | 19425 | 23435 |
| 17840 | 19008 | 16702 | 25920 | 16272 | 16644 | 18879 | 18673 | 15109 | 20391 | 16378 |
| 16803 | 15364 | 18652 | 16139 | 21319 | 18891 | 21805 | 19392 | 15544 | 14734 | 17505 |
| 18399 | 15959 | 18110 | 17044 | 19357 | | | | | | |

| FIG. 6 - Six (6) plots of sixty (60) data points, from 1 to 60: | | | | | | | | | |
|---|---|---|---|---|---|---|---|---|---|
| TCP1 | | | | | | | | | |
| 7812 | 16815 | 26785 | 37640 | 14423 | 5750 | 62500 | 26785 | 9740 | 31250 | 18700 |
| 8690 | 9810 | 12560 | 23810 | 34200 | 21200 | 12390 | 7690 | 8780 | 18729 | 36840 |
| 20120 | 8920 | 16802 | 34280 | 36901 | 13920 | 7690 | 16590 | 32760 | 17650 | 4329 |
| 8903 | 24390 | 43290 | 30912 | 10098 | 7654 | 12458 | 30190 | 42190 | 28760 | 12310 |
| 7630 | 12865 | 43210 | 21650 | 9860 | 18702 | 34908 | 24190 | 10087 | 6530 | 15490 |
| 32980 | 28750 | 11980 | 8750 | 15439 | | | | | | |
| TCP2 | | | | | | | | | |
| 16815 | 16815 | 20833 | 43750 | 8928 | 8522 | 12500 | 7500 | 56000 | 12416 | 7900 |
| 35900 | 23001 | 8790 | 10029 | 16709 | 27650 | 13280 | 6540 | 6508 | 14890 | 31290 |
| 18769 | 9870 | 18760 | 30920 | 26340 | 11890 | 5670 | 15320 | 31240 | 15609 | 4356 |
| 10092 | 15430 | 32900 | 24319 | 12390 | 6542 | 14230 | 28971 | 36570 | 25430 | 13290 |
| 5430 | 16430 | 39870 | 23190 | 10020 | 16540 | 28760 | 19874 | 7860 | 9970 | 18760 |
| 36740 | 24130 | 13540 | 6530 | 18453 | | | | | | |
| RAP1 | | | | | | | | | |
| 5890 | 45690 | 52806 | 43952 | 34898 | 46980 | 61128 | 57247 | 41099 | 34270 | 36179 |
| 60945 | 34002 | 8900 | 9200 | 24540 | 43250 | 21340 | 9657 | 12680 | 18540 | 34200 |
| 38790 | 36570 | 28769 | 21560 | 13450 | 7865 | 16540 | 19870 | 27870 | 34526 | 42536 |
| 39870 | 31260 | 24670 | 16570 | 9345 | 6349 | 23950 | 34281 | 42536 | 54390 | 43120 |
| 32120 | 16230 | 8740 | 18670 | 32454 | 42356 | 31290 | 12987 | 8766 | 18760 | 36542 |
| 18726 | 8765 | 16540 | 35480 | 12980 | | | | | | |
| RAP2 | | | | | | | | | |
| 8730 | 10040 | 17609 | 36844 | 51746 | 60045 | 30805 | 81163 | 41657 | 77964 | 77040 |
| 52345 | 20450 | 10030 | 12420 | 32150 | 37980 | 54370 | 8790 | 18650 | 22980 | 29870 |
| 34526 | 33456 | 26574 | 20980 | 16598 | 9675 | 18657 | 20980 | 24678 | 38970 | 48790 |
| 41230 | 34350 | 21809 | 13460 | 8234 | 10049 | 28730 | 35640 | 48670 | 49830 | 39820 |
| 28120 | 16532 | 6450 | 16540 | 29810 | 39120 | 28718 | 14320 | 7658 | 20932 | 43290 |
| 15234 | 6540 | 19870 | 38708 | 21543 | | | | | | |

| FIG. 7 - Four (4) plots of thirty-eight (38) data points, from zero to 37: | | | | | | | | | |
|---|---|---|---|---|---|---|---|---|---|
| Obj1 (No) | | | | | | | | | |
| 30.37 | 25.3 | 19.92 | 19.9 | 19.62 | 19.4 | 20.99 | 18.82 | 17.36 | 17.09 | 16.66 |
| 16.93 | 15.31 | 14.11 | 13.97 | 13.69 | 13.73 | 14.45 | 13.44 | 12.57 | 12.58 | 12.69 |
| 12.71 | 12.77 | 12.8 | 12.89 | 13.12 | 13.13 | 13.09 | 13.05 | 12.95 | 12.88 | 12.9 |
| 13 | 13.11 | 13.16 | 13.26 | 13.37 | | | | | | |
| Obj3 (N0) | | | | | | | | | |
| 31.46 | 30.98 | 30.2 | 29.81 | 29.6 | 29.28 | 29 | 28.7 | 28.53 | 28.04 | 27.51 |
| 27.23 | 25.43 | 23.75 | 23.27 | 22.87 | 22.46 | 22.82 | 17.6 | 16.41 | 16.44 | 16.58 |
| 17.16 | 17.37 | 17.37 | 17.45 | 17.65 | 17.67 | 17.55 | 17.74 | 17.92 | 18.18 | 18.3 |
| 18.49 | 18.9 | 19.14 | 19.26 | 19.44 | | | | | | |
| Obj1 | | | | | | | | | |
| 30.37 | 8.51 | 7.03 | 6.7 | 25.11 | 24.35 | 24.23 | 23.78 | 23.82 | 23.72 | 24.21 |
| 24.07 | 24.21 | 8.68 | 24.23 | 8.56 | 6.75 | 24.88 | 4.09 | 24.33 | 9.98 | 24.09 |
| 24.03 | 23.99 | 24.02 | 23.84 | 23.83 | 24.22 | 12.42 | 24.23 | 11.26 | 9.13 | 24.08 |
| 14.88 | 23.94 | 23.94 | 24.14 | 24.26 | | | | | | |
| Obj3 | | | | | | | | | |
| 31.46 | 20.79 | 19.94 | 19.66 | 26.47 | 27.35 | 27.34 | 27.49 | 27.54 | 27.61 | 27.73 |
| 27.83 | 27.15 | 18.87 | 26.8 | 18.61 | 17.57 | 27.79 | 14.97 | 25.51 | 18.73 | 26.06 |
| 24.98 | 25.62 | 25.9 | 25.97 | 26.12 | 25.23 | 16.96 | 25.85 | 16.74 | 16.19 | 25.76 |
| 18.34 | 25.93 | 26.38 | 26.4 | 26.2 | | | | | | |

FIG. 8 - Two (2) plots of thirty-eight (38) data points, from zero to 37:

With Resource Allocation

| | | | | | | | | | |
|---|---|---|---|---|---|---|---|---|---|
| 31.38 | 22.81 | 21.44 | 20.69 | 26.68 | 26.88 | 26.82 | 26.7 | 26.68 | 26.61 | 26.67 |
| 26.66 | 26.43 | 19.71 | 26.3 | 19.18 | 16.99 | 27.67 | 15.57 | 25.99 | 18.18 | 26.17 |
| 25.51 | 25.82 | 26.02 | 26 | 26.2 | 25.9 | 18.1 | 26.2 | 17.28 | 16.53 | 26.21 |
| 20.29 | 26.24 | 26.58 | 26.64 | 26.57 | | | | | | |

Without Resource Allocation

| | | | | | | | | | |
|---|---|---|---|---|---|---|---|---|---|
| 31.36 | 28.04 | 27.36 | 26.93 | 26.79 | 26.53 | 26.61 | 25.88 | 24.87 | 24.46 | 23.97 |
| 23.81 | 22.46 | 21.37 | 20.97 | 20.68 | 20.54 | 21.5 | 17.26 | 16.28 | 16.32 | 16.58 |
| 16.97 | 17.12 | 17.22 | 17.32 | 17.64 | 17.8 | 17.51 | 17.61 | 17.66 | 17.88 | 18.08 |
| 18.3 | 18.64 | 18.88 | 19.04 | 19.34 | | | | | | |

FIG. 10 - Two (2) plots of fifty (50) data points, from 0.0 to 4.9, in increments of 0.1:

Available Bandwidth

| | | | | | | | | | |
|---|---|---|---|---|---|---|---|---|---|
| 100 | 100 | 100 | 100 | 100 | 140 | 140 | 140 | 140 | 140 | 100 |
| 100 | 100 | 100 | 100 | 80 | 80 | 80 | 80 | 80 | 100 | 100 |
| 100 | 100 | 100 | 140 | 140 | 140 | 140 | 140 | 100 | 100 | 100 |
| 100 | 100 | 80 | 80 | 80 | 80 | 80 | 100 | 100 | 100 | 100 |
| 100 | 140 | 140 | 140 | 140 | 140 | | | | | |

MSTFP Available Bandwidth

| | | | | | | | | | |
|---|---|---|---|---|---|---|---|---|---|
| 98 | 103 | 99 | 102 | 98 | 136 | 141 | 144 | 138 | 142 | 103 |
| 99 | 105 | 97 | 101 | 83 | 80 | 77 | 81 | 79 | 98 | 102 |
| 99 | 103 | 97 | 136 | 142 | 144 | 139 | 136 | 102 | 99 | 102 |
| 98 | 95 | 81 | 76 | 79 | 82 | 79 | 98 | 103 | 100 | 95 |
| 98 | 137 | 140 | 143 | 141 | 138 | | | | | |

FIG. 11 - Two (2) plots of fifty (50) data points from 1 to 50, incrementing by 1:

NARC Scheme

| | | | | | | | | | |
|---|---|---|---|---|---|---|---|---|---|
| 31.36 | 23.47 | 21.96 | 21.2 | 20.67 | 20.16 | 28.16 | 21.94 | 27.16 | 26.93 | 26.81 |
| 26.76 | 26.72 | 26.73 | 26.84 | 26.71 | 20.45 | 26.35 | 20.18 | 18.41 | 26.14 | 18.95 |
| 17.08 | 28.6 | 15.98 | 26.32 | 19.73 | 18.81 | 26.27 | 26 | 26.29 | 26.41 | 26.44 |
| 26.47 | 26.54 | 26.78 | 26.57 | 18.86 | 26.26 | 18.75 | 16.68 | 16.32 | 26.3 | 20.83 |
| 19.23 | 26.29 | 26.98 | 27.11 | 27.15 | 27.17 | | | | | |

MPEG-4 Q2 Scheme

| | | | | | | | | | |
|---|---|---|---|---|---|---|---|---|---|
| 31.36 | 28.38 | 28.1 | 28.07 | 27.91 | 27.9 | 27.79 | 27.74 | 27.81 | 27.65 | 27.39 |
| 27.16 | 27 | 27.04 | 27.07 | 25.62 | 25.62 | 20.54 | 24.41 | 20.06 | 18.45 | 17.23 |
| 25.32 | 17.12 | 15.14 | 14.1 | 26.83 | 20.86 | 17.87 | 17.39 | 16.8 | 16.41 | 15.96 |
| 25.21 | 19.56 | 17.48 | 16.24 | 15.84 | 15.49 | 22.82 | 17.85 | 17.05 | 16.67 | 16.53 |
| 23.91 | 19.12 | 17.36 | 16.88 | 16.89 | 20.37 | | | | | |

FIG. 12 - Two (2) plots of seventy-four (74) data points, from 1 to 74, incrementing by 1:

NARC Scheme

| | | | | | | | | | |
|---|---|---|---|---|---|---|---|---|---|
| 34.26 | 28.22 | 26.89 | 25.72 | 25.38 | 25.11 | 24.65 | 24.34 | 24.06 | 33.68 | 33.41 |
| 32.95 | 32.64 | 32.35 | 32.26 | 32.18 | 32.04 | 31.93 | 32.03 | 32.04 | 32 | 31.94 |
| 31.97 | 31.81 | 31.94 | 31.85 | 31.93 | 31.86 | 31.76 | 31.67 | 31.65 | 31.51 | 31.6 |
| 31.65 | 31.64 | 31.51 | 31.48 | 31.49 | 31.35 | 31.25 | 31.14 | 31.03 | 31.06 | 30.86 |
| 30.84 | 30.85 | 30.61 | 30.69 | 30.76 | 30.78 | 30.93 | 30.84 | 30.84 | 30.75 | 30.79 |
| 30.56 | 30.61 | 30.66 | 30.63 | 30.75 | 30.73 | 30.75 | 30.83 | 30.78 | 30.75 | 30.55 |
| 30.63 | 30.59 | 30.77 | 30.78 | 30.65 | 30.74 | 30.93 | 30.83 | 30.9 | | |

MPEG-4 Q2 Scheme

| | | | | | | | | | |
|---|---|---|---|---|---|---|---|---|---|
| 34.76 | 28.22 | 26.89 | 25.72 | 33.93 | 33.58 | 33.06 | 30.85 | 32.62 | 32.6 | 28.08 |
| 32.29 | 32.32 | 27.83 | 32.08 | 28.03 | 31.83 | 31.84 | 31.87 | 31.9 | 31.83 | 27.72 |
| 31.83 | 31.61 | 31.6 | 31.59 | 31.52 | 31.41 | 31.44 | 31.34 | 31.31 | 27.39 | 31.25 |
| 31.4 | 31.5 | 31.36 | 27.19 | 31.26 | 31.32 | 28.8 | 31.08 | 31.07 | 27.56 | 30.88 |
| 27.53 | 30.93 | 22.66 | 30.58 | 25.03 | 30.66 | 23.99 | 30.76 | 26.52 | 27.71 | 24.92 |
| 27.39 | 23.9 | 27.13 | 27.5 | 28 | 28.16 | 25.83 | 28.45 | 28.41 | 28.57 | 24.52 |
| 28.74 | 24.63 | 29.18 | 29.35 | 23.48 | 29.41 | 24.99 | 30.01 | 27.29 | | |

What is claimed is:

1. A method for transmitting a mixed media data stream in packets, including audio and video objects, between a sender and a receiver through a connection over a network, the method comprising:

monitoring transmission characteristics of the connection between the sender and the receiver, wherein monitoring transmission characteristics comprises:

estimating a round trip time of a sender packet from the sender to the receiver (RTT) based on a timestamp indicating the time when the sender packet was sent (ST1) and a time interval that the sender packet spent in the receiver side ($\Delta$RT);

estimating a time out interval (TO) before which the sender should retransmit to the receiver a sender packet of data that has not been received by the receiver;

estimating a probability that a packet of data will be lost ($P_L$);

estimating the present available network bandwidth at which the receiver can receive data from the sender (rvcrate);

deriving the present sending rate of data from the sender to the receiver ($\overline{currate}$); and setting an updated sending rate of data from the sender to the receiver (currate), wherein:

if rvcrate is greater than $\overline{currate}$, then deriving currate as a function $\overline{currate}$, PacketSize, and RTT; and if rvcrate is not greater than $\overline{currate}$, then setting currate to be less than rvcrate;

allocating a global buffer for the mixed media data stream to be transmitted from the sender to the receiver as a function of the estimated available bandwidth at the sender;

pre-encoding a portion of each Video Object Plane (VOP) in the global buffer with respect to a quantization parameter (QP) of the VOP;

encoding the VOP in the global buffer based on the QP;

updating a rate distortion model based upon the QP and packet loss rate;

performing a frame skipping function after the VOP encoding;

transmitting the encoded VOP to the receiver in a sender packet over a packet switched network at a regulated sender transmission rate as a function of the estimated available bandwidth at the sender, wherein a header of the sender packet includes: (1) a packet sequence number, (2) the timestamp indicating the time when the sender packet was sent (ST1), and (3) the size of the sender packet (PacketSize); and receiving a receiver packet from the receiver over the packet switched network, wherein a header of the receiver packet includes: (1) the time interval that the sender packet spent in the receiver side ($\Delta$RT), (2) the timestamp of the sender packet sent from the sender (ST1), (3) an estimate, calculated by the receiver, of a packet-loss rate, and (4) the rate at which data is received at the receiver.

2. The method as defined in claim 1, further comprising:

receiving the encoded video object plane at the receiver from the connection;

demultiplexing the encoded video object plane into coded video and audio streams;

inputting the coded video and audio streams, respectively, into video and audio decoders;

inputting the decoded video and audio streams to a media mixer; and inputting the mixed video and audio streams output from the media mixer to an output device.

3. The method as defined in claim 1, wherein pre-encoding a portion of each VOP with respect to the QP of the VOP further comprises adjusting the QP of the VOP.

4. The method as defined in claim 1, wherein:

$$P_L = \frac{\hat{q}}{\hat{p} + \hat{q}};$$

$$\{X_i\}_{i=1}^n;$$

$X_i$ takes 1 if the ith sender packet has arrived successfully at the receiver;

$X_i$ takes 0 if the ith sender packet is lost;

$$p = P[X_i = 1 \mid X_{i-1} = 0];$$

$$q = P[X_i = 0 \mid X_{i-1} = 1];$$

-continued $\hat{p}$ is an estimate of $p$;

$\hat{q}$ is an estimate of $q$; and $\hat{p} = n_{01}/n_0$ and $\hat{q} = n_{10}/n_1$, wherein:

$n_{01}$ is the number of times in an observed time series when one follows zero;
$n_{10}$ is the number of times when zero follows one;
$n_0$ is the number of zeros; and
$n_1$ is the number of ones.

5. The method as defined in claim 4, wherein:
the $P_L$ is further smoothed by a filter that weights the n most recent measured packet loss rates by:

$$P_{L,i} = \sum_{j=0}^{n-1} (w_j \times \overline{P_{L,i-j}});$$

$\overline{P_{L,i-j}}$ is the measured packet loss rate in the (i–j)th time interval;
two set of weighting parameters are defined as follows:

|    | 0  | 1  | 2  | 3  | 4  | 5  | 6  | 7  |
|----|----|----|----|----|----|----|----|----|
| S1 | .0 | .0 | .0 | .0 | .8 | .6 | .4 | .2 |
| S2 | .2 | .2 | .0 | .0 | .8 | .5 | .3 | .1 | and WS2 is used for $w_j$ when the actual packet loss rate is less than halt of the measured packet loss rate, otherwise WS1 is used for $w_j$.

6. A computer-readable media comprising computer-executable instructions for performing the method as recited in claim 1.

7. One or more computer-readable media having computer-readable instructions stored thereon, wherein the computer-readable media includes:
a first set of elements to describe a server in communication through a connection of a packet switched network to a client;
a second set of elements to describe the transmission of a mixed media data stream, including audio and multiple video objects (MVOs), from the server to the client through a connection over a packet switched network; and
a code segment that, when executed:
monitors transmission characteristics of the connection between server and receiver, wherein monitoring transmission characteristics comprises:
estimating a round trip time of a sender packet from the sender to the receiver (RTT);
estimating a time out interval (TO) before which the sender should retransmit to the receiver a sender packet of data;
estimating a probability that a packet of data will be lost ($P_L$);
estimating the present available network bandwidth at which the receiver can receive data from the sender (rvcrate);
deriving the present sending rate of data from the sender to the receiver ($\overline{currate}$); and
setting an updated sending rate of data from the sender to the receiver (currate), wherein:
if rcvrate is greater than currate, then deriving currate as a function $\overline{currate}$, and RTT; and
if rcvrate is not greater than $\overline{currate}$, then setting currate to be less than rcvrate
allocates a global buffer for the mixed media data stream to be transmitted stream from the sender to the receiver as a function of the estimated available bandwidth at the sender;
pre-encodes a portion of each Video Object Plane (VOP) in the global buffer with respect to a quantization parameter (QP) of the VOP;
encodes the VOP in the global buffer based on the QP;
updates a rate distortion model based upon the QP and packet loss rate;
performs a frame skipping function after the VOP encoding;
transmits the encoded VOP to the receiver in a sender packet, wherein a header of the sender packet includes: (1) a packet sequence number, (2) the timestamp indicating the time when the sender packet was sent (ST1), and (3) the size of the sender packet (PacketSize); and
receives a receiver packet from the receiver, wherein a header of the receiver packet includes: (1) the time interval that the sender packet spent in the receiver side (ΔRT), (2) the timestamp of the sender packet sent from the sender (ST1), (3) an estimate, calculated by the receiver, of a packet-loss rate, and (4) the rate at which data is received at the receiver.

* * * * *